(12) United States Patent
Walser et al.

(10) Patent No.: US 8,978,913 B2
(45) Date of Patent: Mar. 17, 2015

(54) FILLER NECK FOR THE FUEL TANK OF A MOTOR VEHICLE WITH SELECTIVE OPENING

(75) Inventors: Herbert Walser, Ilz (AT); Dominik Steinmann, Stubenberg (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 299 days.

(21) Appl. No.: 13/399,989

(22) Filed: Feb. 17, 2012

(65) Prior Publication Data
US 2012/0211489 A1   Aug. 23, 2012

(30) Foreign Application Priority Data
Feb. 17, 2011 (DE) .......................... 10 2011 011 518

(51) Int. Cl.
  *B65D 3/06* (2006.01)
  *B60K 15/04* (2006.01)
  *B65D 47/00* (2006.01)

(52) U.S. Cl.
  CPC ......... *B60K 15/04* (2013.01); *B60K 2015/0483* (2013.01)
  USPC ........................................ 220/86.2; 220/86.3

(58) Field of Classification Search
  USPC .............................. 220/86.2, 86.3
  See application file for complete search history.

(56) References Cited

U.S. PATENT DOCUMENTS

| | | | | |
|---|---|---|---|---|
| 3,730,216 A | * | 5/1973 | Arnett et al. ................... | 137/588 |
| 5,462,100 A | * | 10/1995 | Covert et al. .................... | 141/59 |
| 6,968,874 B1 | * | 11/2005 | Gabbey et al. ................ | 141/349 |
| 7,182,111 B2 | * | 2/2007 | McClung et al. ............. | 141/352 |
| 7,293,586 B2 | * | 11/2007 | Groom et al. ................. | 141/350 |
| 7,621,303 B2 | * | 11/2009 | Buchgraber .................. | 141/350 |
| 8,191,588 B2 | * | 6/2012 | Hagano ........................ | 141/350 |
| 8,567,458 B2 | * | 10/2013 | Sato et al. ..................... | 141/350 |
| 2007/0034287 A1 | * | 2/2007 | Groom et al. ................. | 141/350 |
| 2009/0145899 A1 | * | 6/2009 | Benjey et al. ................ | 220/86.2 |
| 2011/0315682 A1 | * | 12/2011 | Tsiberidis .................... | 220/86.2 |
| 2013/0075395 A1 | * | 3/2013 | Hagano ........................ | 220/86.2 |

* cited by examiner

*Primary Examiner* — Mickey Yu
*Assistant Examiner* — Niki Eloshway
(74) *Attorney, Agent, or Firm* — Jordan IP Law, LLC; Todd A. Vaughn

(57) ABSTRACT

A filler neck for the fuel tank of a motor vehicle has a funnel insert having a lockable flap with a lock, which is held by two elements which can each be pivoted about a pin. The flap is released only when both elements are pivoted to one side simultaneously by the filler tube of a gas pump nozzle. In order to open the flap with minimal actuating forces, the first element can be pivoted about a first pin and holds the hinge pin for the flap on its end far from the first pin, and the second element can be pivoted about a second pin and forms a locking hook. The two pins have a spatial distance from one another in the transverse direction and the two elements are loaded with respect to one another by at least one spring.

19 Claims, 4 Drawing Sheets

FILLER NECK FOR THE FUEL TANK OF A MOTOR VEHICLE WITH SELECTIVE OPENING

CROSS-REFERENCE TO RELATED APPLICATIONS

The present application claims priority under 35 U.SC. §119 to German Patent Application No. 10 2011 011 518.8 (filed on Feb. 17, 2011), which are each hereby incorporated by reference in its entirety.

FIELD OF THE INVENTION

The invention relates to a filler neck for the fuel tank of a motor vehicle with a funnel insert and adjoining it at an inward direction a flap with a lock. The flap is held in a rotatable manner about a hinge pin that can be displaced in space and by two elements which can each be pivoted about a pin. The flap is released only when both elements are pivoted to one side simultaneously by the filler tube of a gas pump nozzle.

It is thereby achieved in the case of tanks for diesel fuel that the flap is unlocked and can be opened only upon insertion of the filler tube of a gas pump nozzle with sufficiently large diameter. A filler tube for gasoline has a smaller diameter so that both elements cannot be pivoted simultaneously. Because fuelling with incorrect fuel generally leads to the destruction of the engine, this must be prevented at all cost.

BACKGROUND OF THE INVENTION

A generic filler neck is known from WO 2006/007618 A1. Because the hinge pin of the flap and the lock thereof are not fixed in space, the flap and the elements holding it can orient themselves in space in accordance with an oblique positioning of a filler tube with small diameter. It is thus no longer possible to circumvent the locking means.

Upon the insertion of a filler tube with the "correct" diameter, this rides on two cams facing towards one another of the elements, and the two elements are simultaneously forced outwards. However, it has been shown that the elements pivoted about a common pins are kinematically unfavorable, because the force in the longitudinal direction necessary to open the lock and the wear of the cams is very great.

SUMMARY OF THE INVENTION

The problem on which the invention is based is therefore to further develop a generic filler neck such that the opening of the flap requires minimal activating forces and a further enhanced reliability of the function is achieved with the lowest possible production costs.

In accordance with the invention, this is essentially achieved in that the two elements can be pivoted about pins spaced apart from one another in the transverse direction, and that they are loaded with respect to one another by the force of the spring acting between them. The axes spaced apart from one another lie approximately over the contact point of the filler tube of the gas pump nozzle and the normal on the contact point is very far removed from the pin of the element. The favorable kinematic and force ratios achieved thereby result—with the "correct" filler tube—in an easy opening of the flap and low wear. Because the spring force acts between the elements (and not between them and the filling funnel or the filler neck), its effect on both elements is fully retained even if a filler tube of the gas pump nozzle is inserted obliquely. It, therefore, cannot be circumvented, even with great skill.

In an embodiment that is favorable in every respect, the bearing for the elements is arranged on both sides of the funnel insert and respectively one bearing part is in one piece with the funnel insert and the second bearing part is in one piece with the element. This means that a low number of components and, due to the bearings of respectively one element spaced far apart from one another, a stable bearing of the elements is achieved. To this end, the elements are advantageously embodied such that they respectively form a bracket surrounding the funnel insert from one bearing to the other and merge towards the interior of the tank into the hinge or into the locking hooks.

In an advantageous embodiment, the bearing for the first and for the second elements is respectively composed of hollow cylinders with an opening on the funnel insert or on the element and of flattened journal pins on the element or on the funnel insert. The openings and the flat spots are arranged such that during assembly—before the installation into the filler neck—the journal pins can be inserted into the hollow cylinders and then are pivoted downwards into their operating position. In this position, the journal pins can no longer leave the hollow cylinders. In a preferred embodiment, the hollow cylinders are shaped with the opening on the funnel insert, but they can also be attached to the elements.

In an alternative embodiment, the bearing of the first and second element is respectively composed of cylindrical journals without flat spots and of closed hollow cylinders, such that the elements are elastically flexible so that they can be bent up during assembly. Preferably, the journals are respectively arranged on the funnel insert.

In a further particularly advantageous embodiment, the bearing of the first and second element is respectively composed of cylindrical journals and of closed hollow cylinders, such that the elements are produced by way of injection into a mold in which the funnel insert is inserted. This production method is also referred to as coating, such that the parts of the funnel insert exposed in the mold are provided with a release layer usually applied in a liquid manner. Here, too, preferably the journal is respectively embodied on the funnel insert and the hollow cylinder on the element.

An advantageous detail lies in that the elements are loaded with respect to one another by means of at least one (or two) helical tension springs acting thereon below the bearing. This produces a large spring force in all angular positions of the elements and increases security.

DETAILED DESCRIPTION OF EMBODIMENTS

Figure 1:
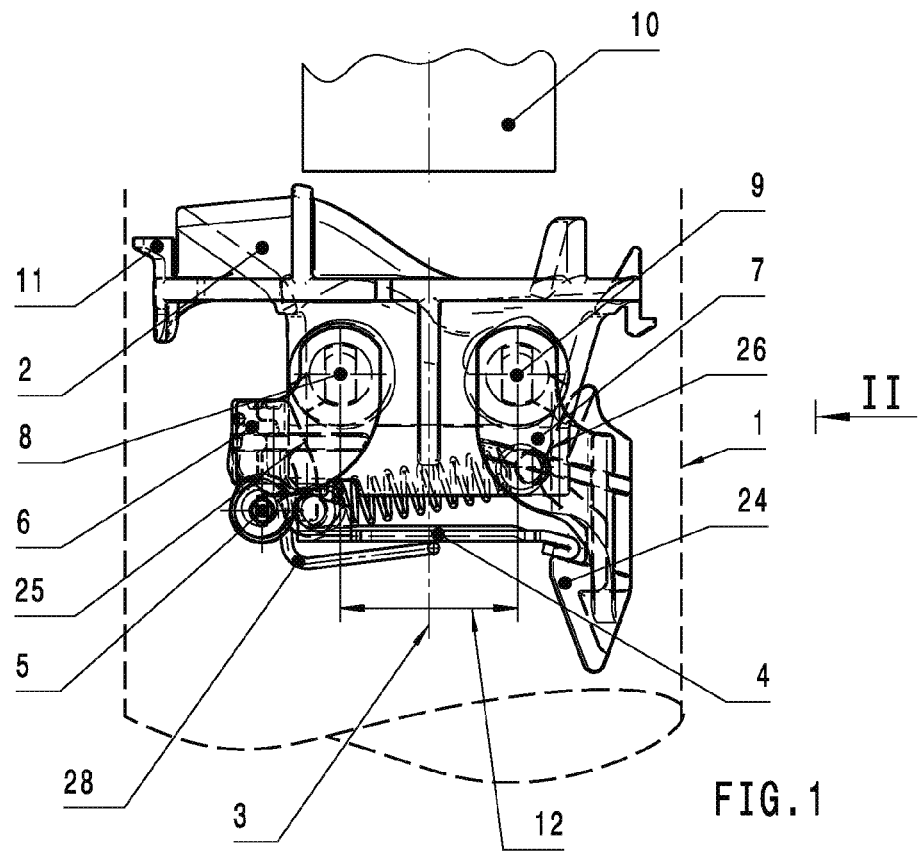
FIG. 1 illustrates a filler neck with installations in accordance with the invention.

As illustrated in FIG. 1 the filler neck 1 belonging to a fuel tank 1 (not shown) is indicated by a dashed line, because the shape thereof and optionally further installations are irrelevant for the invention. The funnel insert 2 with a flap 4 on its lower end is essential. The funnel insert 2 is attached, for example, by way of parts 11 in the filler neck 1, but can be attached in any other desired manner. The flap 4 can be pivoted inwards by a hinge pin 5. The filler tube of a gas pump nozzle 10 is merely indicated and the center line of the filler neck 1 is marked by 3. A first element 6 is hinged in a pivoted manner about a first pin 8 and a second element 7 about a second pin 9 on the funnel insert 2. The pins 8, 9 are arranged at the same height at a distance 12 from one another, which distance is approximately as large as (here it is somewhat smaller than) the width of the flap 4.

The first element 6 is swivel-mounted near to its upper end on both sides of the funnel insert 2 and has on its lower end the hinge pin 5 for the flap 4 and a side spring 28 loading it in the closing direction. The second element 7 is also swivel mounted on both sides of the funnel insert 2 and forms on its lower end a locking hook 24, which holds the flap 4 in the closed position until the filler tube 10 with the correct (larger) diameter simultaneously presses both ramps 25, 26 outwards. The ramps 25, 26 are embodied on the two elements 6, 7 and indicated by dashed lines in FIG. 1. They can be seen better in FIG. 4.

Figure 2:
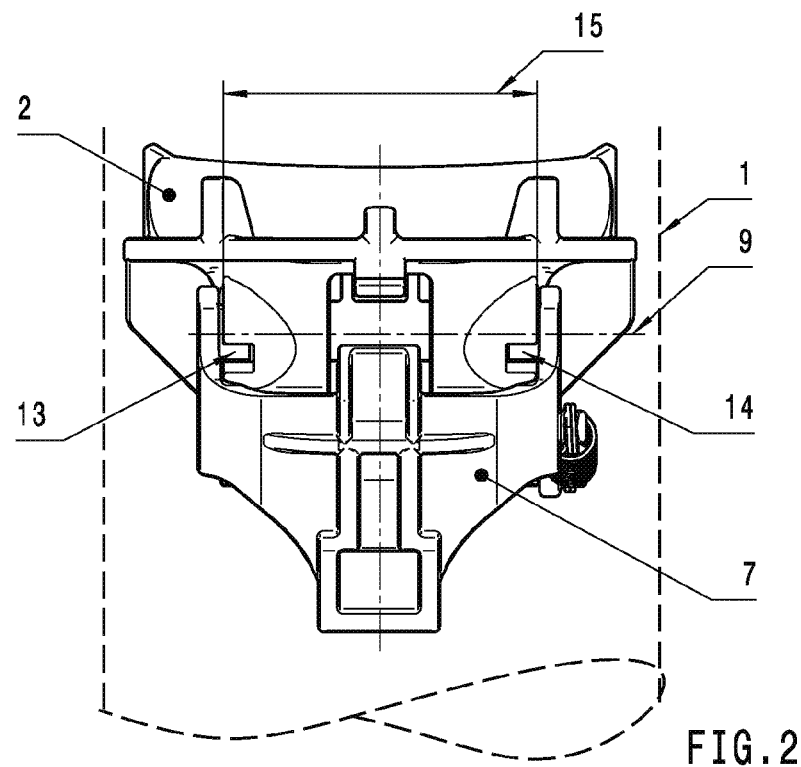
FIG. 2 illustrates the filler neck at View II in FIG. 1.

As illustrated in FIG. 2, which is a view rotated by 90 degrees from FIG. 1, it can be seen that the second element 7 (as well as the first element 6) is supported on both sides of the funnel insert 2 by way of respectively one bearing 13, 14. The two bearings have a distance 15 from one another and can be embodied differently in accordance with the invention, as can be seen in the following figures.

Figure 4:
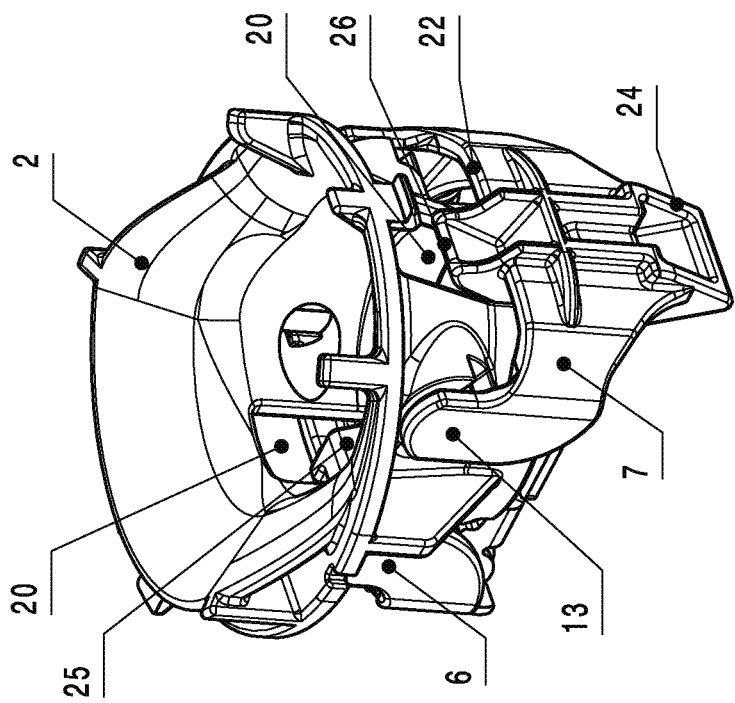
FIG. 4 illustrates a top perspective view of the filler neck in FIG. 2.
Figure 3:
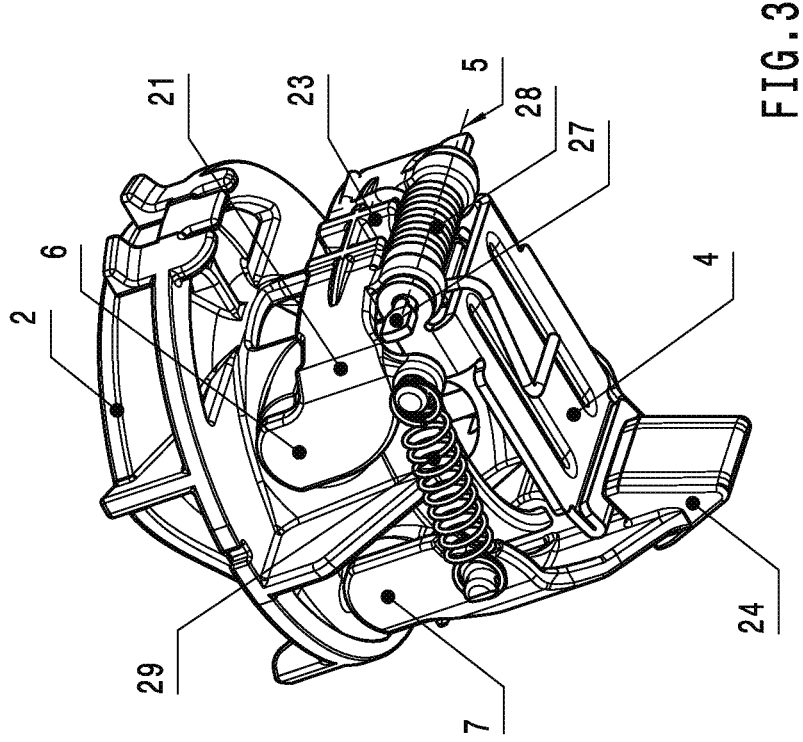
FIG. 3 illustrates a bottom perspective view of the installations in accordance with the invention in a first embodiment.

As illustrated in FIGS. 3 and 4, the subject matter of the invention is provided in a three-dimensional manner. Firstly, it is discernible that the two elements 6, 7 are the brackets 21, 22 connecting the bearings 13, 14 lying far apart from one another and surrounding the funnel insert 2 on the outside, which brackets merge downwards into a locking hook 24 or into a hinge part 23. The hinge part 23 is wound about by the side spring 28 and contains a pin 27 riveted at its ends as hinge pin for the flap 4. In their center the brackets form ramps 25, 26, which project through windows 20 (FIG. 4) into the interior of the funnel insert 2. Between the two elements 6, 7 under the pins 8, 9 a helical tension spring 29 is attached, which draws the elements 6, 7 towards one another, and thus, holds the flap 4 locked. Up to this point the description applies to all embodiments and variants.

Figure 5:
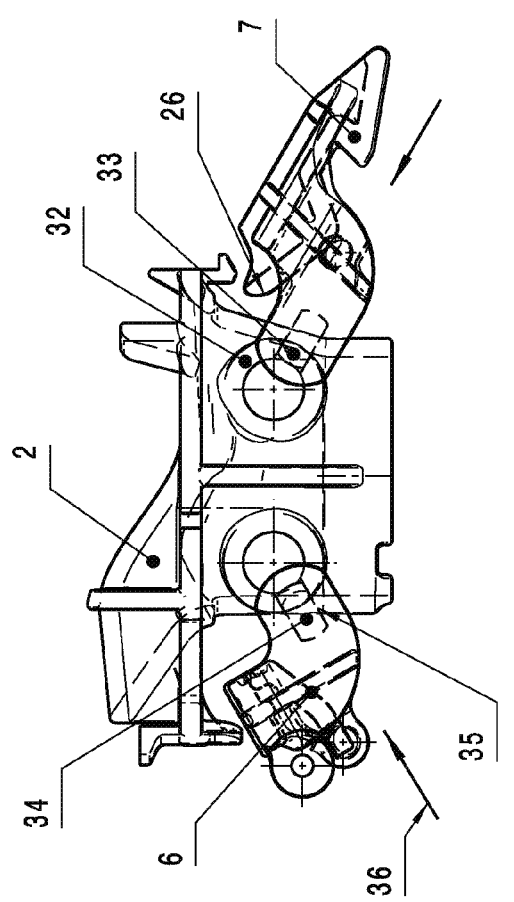
FIGS. 5A and 5B illustrate stages of assembly of the filler neck in accordance with the first embodiment.
Figure 5:
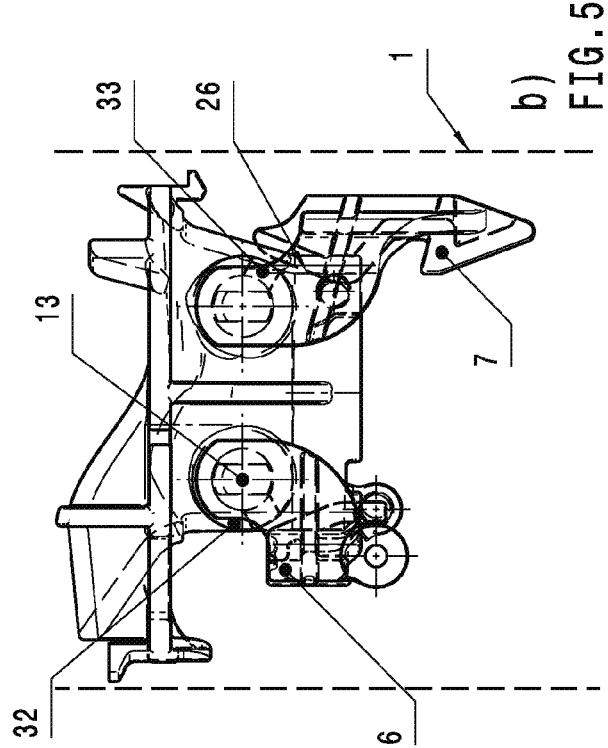

As illustrated in FIG. 5, the bearings 13, 14, which are respectively identical for both elements 6, 7, are provided in a first embodiment. The bearings 13, 14 are formed by two bearing parts, respectively, one on the funnel insert 2 and one on the elements 6, 7. The bearing parts are hollow cylinders 32 shaped on the funnel insert 2 with respectively one opening 33. The opening 33 is approximately facing towards the wall of the filler neck 1. Journal pins 34 with planar flat spots on both sides are shaped on the elements 6, 7. The flat spots 35 are aligned such that they can be inserted through the openings 33 (arrow 36) only when the element is in the approximately horizontal position (see FIG. 5a)). This position is possible only before the funnel insert 2 thus assembled is inserted into the filler neck 1. But not in the installed position pivoted downwards (see FIG. 5B. Likewise as a variant, however, the hollow cylinders with opening could also be shaped on the elements 6, 7 and the journals with flat spot on the funnel insert.

Figure 6:
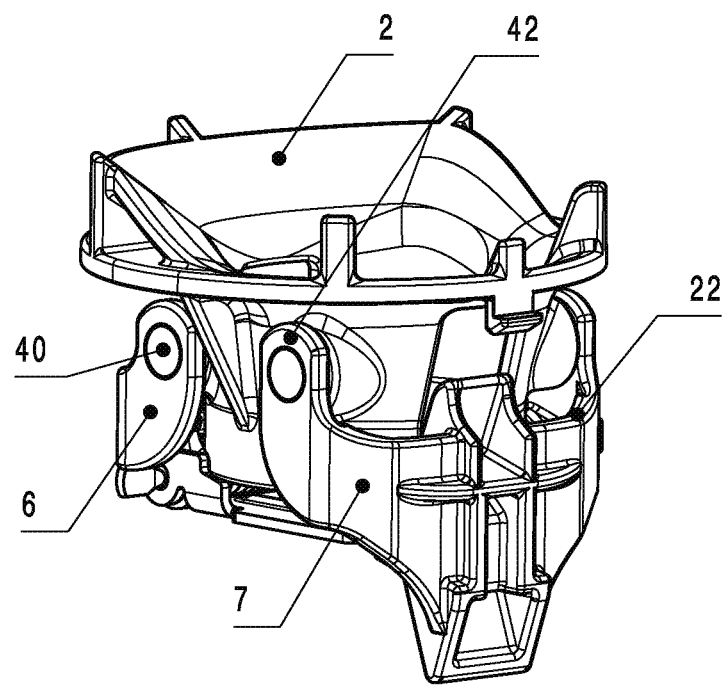
FIG. 6 illustrates the installations in accordance with a second embodiment.

The embodiment of FIG. 6 differs from that just described in that a hollow cylinder 42 closed all around and a cylindrical journal 40 without flat spots replace the parts 32, 34 of the first embodiment. For the production or assembly, there are two possibilities. Either the brackets 21, 22 of the elements 6, 7 are bent elastically apart so that on both sides only the short journals 40 can snap into the hollow cylinders 42. Or the production of the elements 6, 7 is carried out "in situ" in accordance with a recently possible method: the funnel insert 2 is placed into a mold such that only the surfaces then coming into contact with the elements 6,7 are exposed. These surfaces are provided with a coating that prevents a connection by adhesive force of the plastic (with lower melting point) injected subsequently into the correspondingly designed mold to form the elements.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A filler neck for a fuel tank of a motor vehicle, the filler neck comprising:
   a flap having a lock, the flap being rotatably mounted via a hinge pin, a first element and a second element, and a spring having a force which acts between the first element and the second element, the first element being pivotably moveable about a first pin at a first pivot axis and the second element being pivotably moveable about a second pin at a second pivot axis, wherein the first pin and the second pin are spaced apart from one another in a transverse direction such that the first pivot axis and the second pivot axis are spaced apart from one another, and wherein the flap is released only when the first element and the second element are pivoted simultaneously by a filler tube of a gas pump nozzle.

2. The filler neck of claim 1, wherein:
   the first element holds a hinge pin on its end far from the first pin; and
   the second element forms a locking hook on its end far from the second pin.

3. The filler neck of claim 1, further comprising a funnel insert, wherein the flap is adjoined to the funnel insert at an inward direction thereof.

4. The filler neck of claim 3, wherein:
   the first element has a first bearing;
   the second element has a second bearing; and
   the first bearing and the second bearing are arranged on both sides of the funnel insert.

5. The filler neck of claim 4, wherein the first bearing and the second bearing each comprise:
   a first bearing portion connected to the funnel insert; and
   a second bearing portion connected to a respective one of the first element and the second element.

6. The filler neck of claim 4, wherein the first element and the second element form brackets respectively surrounding the funnel insert from the first bearing to the second bearing and merge towards an interior of the fuel tank into the hinge.

7. The filler neck of claim 4, wherein the first element and the second element form brackets respectively surrounding the funnel insert from the first bearing to the second bearing and merge towards an interior of the fuel tank into locking hooks.

8. The filler neck of claim 4, wherein the first bearing and the second bearing is respectively composed of hollow cylinders with an opening and journal pins with flat spots.

9. The filler neck of claim 8, wherein the flat spots are aligned so as to be inserted through the openings only when the corresponding first element and second element is in an approximately horizontal position.

10. The filler neck of claim 9, wherein the first bearing, the second bearing, and the hollow cylinders are attached to the funnel insert.

11. The filler neck of claim 4, wherein the first bearing and the second bearing are respectively composed of cylindrical journals and closed cylinders.

12. The filler neck of claim 11, wherein the first element and the second element are elastically flexible in a manner such that the spatial distance between the first bearing and the second bearing bearings is respectively enlarged elastically for assembly.

13. The filler neck of claim 11, wherein first bearing, the second bearing and the journals are respectively arranged on the funnel insert.

14. The filler neck of claim 4, wherein the first bearing and the second bearing are respectively composed of cylindrical journals and of closed, hollow cylinders.

15. The filler neck of claim 14, wherein the first bearing, the second bearing the journal are formed on the funnel insert and the closed, hollow cylinder on the first element and the second element.

16. The filler neck of claim 1, wherein the first element and the second element are loaded with respect to one another by at least one helical tension spring acting thereon under the first bearing and the second bearing.

17. A filler neck for a fuel tank of a motor vehicle, the filler neck comprising:
   a funnel insert;
   a flap adjoined to the funnel insert at an inward direction thereof, the flap having a lock, the flap being rotatably mounted via a hinge pin, a first element having a first bearing and a second element having a second bearing, the first bearing and the second bearing being arranged on both sides of the funnel insert, the first element being pivotably moveable about a first pin and the second element being pivotably moveable about a second pin, wherein the flap is released only when the first element and the second element are pivoted simultaneously by a filler tube of a gas pump nozzle,
wherein the first element and the second element is respectively composed of hollow cylinders with an opening and journal pins with flat spots, and are loaded with respect to one another by at least one spring.

18. The filler neck of claim 17, wherein:
the first element holds a hinge pin on its end far from the first pin; and
the second element forms a locking hook on its end far from the second pin.

19. A filler neck for a fuel tank of a motor vehicle, the filler neck comprising:
   a flap having a lock and which is rotatably mounted via a hinge pin, a first element having a first bearing and a second element having a second bearing, the first element being pivotably moveable about a first pin and the second element being pivotably moveable about a second pin such that the flap is released only when the first element and the second element are pivoted simultaneously by a filler tube of a gas pump nozzle; and
   a funnel insert in which the first bearing and the second bearing are arranged on both sides thereof, the first element and the second element forming brackets respectively surrounding the funnel insert from the first bearing to the second bearing and merge towards an interior of the fuel tank into locking hooks.

* * * * *